Figure 1:
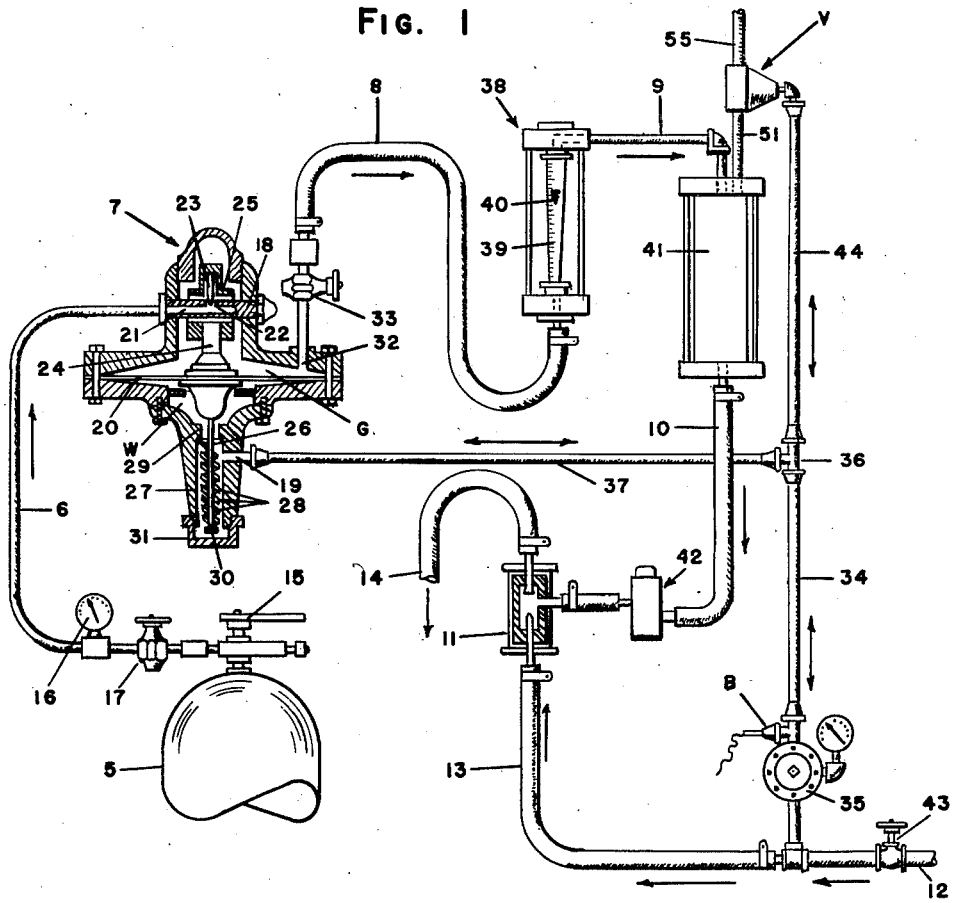

May 5, 1953  R. B. EVERSON  2,637,690

MEANS FOR MIXING AND FEEDING CHLORINE GAS

Filed Feb. 11, 1950

INVENTOR.
ROY B. EVERSON

Patented May 5, 1953

2,637,690

UNITED STATES PATENT OFFICE 2,637,690

MEANS FOR MIXING AND FEEDING CHLORINE GAS

Roy B. Everson, Chicago, Ill.

Application February 11, 1950, Serial No. 143,710

4 Claims. (Cl. 210—28)

The present invention relates to an improved arrangement for regulating the feed of chlorine gas to a liquid where the gas is mixed with such liquid to provide a solution for discharge at a point of application.

One of the features of the present improvement is the provision of a gas regulating and control arrangement which is activated hydraulically by the pressure of the water which is to be mixed with the gas for discharge at the point of application, such regulating arrangement being effective to stop the flow of gas in the event of failure of water pressure due to leakage or by the intentional shut-off of the water supply.

Also this improvement embodies a safety arrangement which operates, upon the failure or the shut-off of water pressure, to then effectively exhaust the conduits of the chlorine gas and vent such gas into the atmosphere.

Additional objects, aims and advantages of the improvements contemplated herein will be apparent to persons skilled in the art after understanding the construction and operation of the present means for feeding, or shutting off direct feed of chlorine gas or other purifying gaseous or semi-gaseous agent.

Reference is now made to the accompanying drawings which form a part of this specification.

Figure 2:
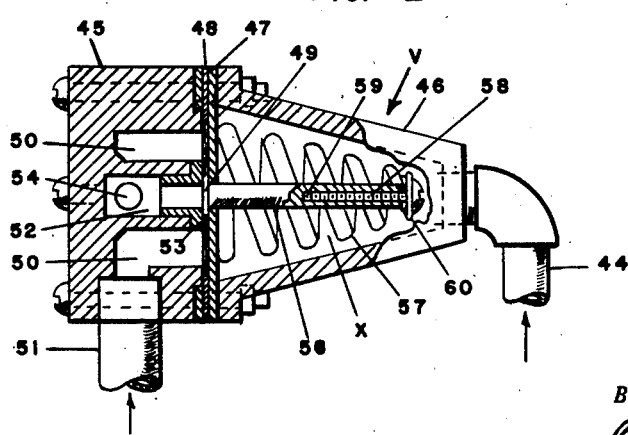

In the drawings:

Fig. 1 is a schematic lay-out showing a typical embodiment of the invention contemplated herein; and Fig. 2 is a detail view in section of an assembly which is employed for automatically evacuating the gas from the active portions of the conduit system.

The drawings are to be understood as being of a generally schematic character for the purpose of disclosing a typical or preferred embodiment of the arrangement contemplated herein, and in these drawings like reference characters identify the same parts in the different views.

Referring particularly to Fig. 1, it will be seen that in carrying out these improvements the supply of chlorine gas is fed at high pressure from a source such as a tank or cylinder 5, through pipe 6 to a pressure reducing and regulating valve assembly 7. The chlorine gas then flows through communicating conduits 8, 9 and 10 to an injector assembly 11 where such gas is mixed with water or other liquid under pressure from a water main supply pipe 12 which has a principal branch 13 leading to the injector, the discharge outlet of such injector being connected to a feed conduit 14 which leads to the point of application.

The gas tank or cylinder 5 has the usual shut-off or control cock 15 which is opened after the cylinder has been coupled to the pipe 6 leading to the reducer valve assembly 7, and said pipe 6 is provided with a pressure gauge or indicator 16 and also has a manually operable shut-off valve 17.

The reducing and proportioning valve assembly 7 (which is enlarged for clearness in Fig. 1) functions to properly reduce the gas pressure and at the same time regulates the flow of such gas and compensates for variable tank pressures. This valve assembly is also utilized to shut-off the flow of gas whenever water pressure ceases or falls below a predetermined minimum. The valve assembly 7 is shown to comprise walls defining a gas chamber G having a gas inlet fitting 18 and a non-communicating liquid chamber W having a water inlet 19, said chambers being separated by flexible diaphragm means 20 the margin of which is firmly clamped between the circumferential rim of the top and bottom housing sections forming the chambers G and W respectively. The gas inlet fitting 18 has a bore 21 partly through its length and includes a valve seat 22 communicating with said bore and controlled by a needle valve 23 to establish communication with the gas chamber G. A link or post 24, which is supported by the diaphragm means 20, supports an annular yoke 25 surrounding the fitting 18 and carrying the needle valve stem 23.

Secured to the underside of diaphragm 20 is a guide or tension rod 26 which extends downwardly into the bore 27 of a lower extension of the bottom housing where said rod is surrounded by a coiled spring 28 which has its upper end engaged with a shoulder or abutment 29 in the bore 27 above the water inlet 19, while the lower end of said spring seats against an adjusting nut 30 screwed onto the threaded lower end of the rod 26 below the inlet. A cap 31 is threaded on the lower end of the bottom housing to close the bore 27. The gas outlet 32 from the chamber G communicates with conduit 8 through a hand-operated valve 33 which may be manually set to control the flow of gas at a regulated reduced pressure, to the remainder of the conduit system.

The valve assembly 7, when active, is operated in response to water pressure from the main supply pipe 12. In order to utilize this water pressure a branch 34 leads from the main pipe 12 at a point ahead of the injector assembly 11, through a water pressure reducer 35 to a T-coupling 36 and thence through the branch extension pipe 37 to the liquid inlet 19 of regulating valve assembly 7. Thus the water pressure reducer 35 reduces main line water pressure and maintains a constant water pressure in the hydraulic chamber W of regulating valve assembly 7. The water at less than main pipe pressure enters the chamber W of reducing valve assembly 7 where it exerts pressure against the lower surface of diaphragm 20 and acts thereon in opposition to the pressure of spring 28 to thereby open or close the valve 22 by properly raising or seating the needle valve 23. This is effective to control the needle valve according to the pressure of the water delivered to the chamber W and to reduce the pressure of the gas.

The controlled gas leaving the valve assembly 7 at the reduced pressure flows through the control valve 33 which has been manually set, and then flows into conduit section 8 from which it is delivered to the bottom of a visual flow meter 38 of the type known as a "rotameter" comprising an upwardly diverging scaled tube 39 in which a rotating float 40 rises and falls to indicate on the scale the rate of gas flow. The upper discharge end of tube 39 communicates with conduit section 9 leading into the top of an expansion chamber 41 through which the gas flows in a downward direction and discharges into conduit section 10 leading to the gas inlet of the injector assembly 11 where the water nozzle intermingles the gas and liquid for feeding such gasified liquid to the point of application through conduit 14. It will be noted there is a check valve 42 in said conduit 10 located adjacent the injector to prevent accidental flow of water backward in said conduit to said expansion chamber 41.

The flow of water into the liquid side of the system is regulated by a hand valve 43 in the water main supply pipe 12 thus, controlling the water flow to whatever volume may be desired. A water pipe branch 44 leads from the T-coupling 36 into an assembly V for automatically actuating the means which will evacuate the gas from the active portions of the gas conduit system and its closely related accessories upon failure of the water supply, or the shutting off of the supply by closing valve 43. This assembly V is therefore hydraulically operated by the same water pressure which also operates the gas pressure regulating valve assembly 7.

The assembly V, as shown in detail in Fig. 2, comprises a suitably shaped housing defined by a bored cylindrical body section 45 and a hollow conical cap section 46, said sections being properly secured together with a sealing gasket member between them. Dividing these sections there is a rubber diaphragm 47 and a metal diaphragm 48, the latter having a washer-like central disk 49 to function as a valve member. The rubber diaphragm 47 and the conical cap section 46 comprise a water chamber X communicating with branch water pipe 44, and there is an annular bore 50 in section 45 which communicates with the top of expansion chamber 41 by means of a pipe 51. The central bore 52 of housing section 45 has a valve seat 53 which is aligned with the disk 49 on the metal diaphragm 48, and said bore 52 has an outlet 54 leading to the atmosphere through a vent pipe 55. A stem 56, carried by disk 49, passes through the rubber diaphragm 47 and projects into the conical section 46 of the housing where it is surrounded by a tension spring 57 that is adjusted by means of a set screw 58 which is received in the threaded bore 59. Spring 57 seats at one end on the rubber diaphragm 47 and at its opposite end it abuts the retainer means 60 on the screw 58 next the head of the latter. Engagement of disk 49 with seat 53, due to the water from the main 12 exerting its pressure on the diaphragm, thus overcoming the pressure of the spring 57, and thereby trap the chlorine gas in the annular bore 50. When the water pressure falls below a minimum (or the water is shut off), the spring 57 will raise disk 49 off its seat 53 and allow the chlorine gas to flow out of the annular bore 50 and enter the central bore 52 and then pass through outlet 54 and pipe 55 to the atmosphere, thus evacuating the chlorine gas from the system of conduits. In addition, when this evacuation takes place, check valve 42 adjacent the injector 11 will close and the gravity of such water as may reach said valve from the injector 11 will be effective to assist in holding said check valve 42 in a closed or seated position and thus prevent water backing up into the chlorine gas expansion chamber 41 and other portions of the conduit system. Also, the water in branch pipes 37, 44 and 34, having been relieved of pressure, will flow backward and drain out of these pipes through a bleed B adjacent the water pressure reducer 35. When water pressure has been restored, these branch pipes will refill with pressure fluid and the system will become active. The bleed B is also effective in assisting in maintaining the constant pressure established by reducer valve 35 in branch pipes 34 and 37 when the evacuator V is closed during normal operation of the system. This is due to the fact that the fluid pressure in pipe 44 and in the liquid chamber of the evacuator V tends to increase in said pipe and thereby modify the reduced fluid pressure in branch pipe 37 leading to the gas reducer valve assembly 7.

It is apparent the arrangement contemplated herein is well adapted to provide a regulated chlorine solution which is discharged to the point of application. In addition, the conduit system will be evacuated of the chlorine gas any time should the water pressure fail due to breakage in the water main. Such evacuation may also be effected, whenever repairs are required in the system, by closing shut-off valve 43 in the water main and either or both gas shut-off valves 17 or 33.

While this invention has been shown and described in a typical or preferred embodiment, it will be apparent to persons skilled in the art, after understanding the improvements contemplated herein, that changes and modifications thereof may be made therein according to the requirements of each particular installation without departing from the spirit or scope hereof. It is aimed in the appended claims to cover all such changes and modifications.

What is claimed is:

1. Chlorine gas feeding and control means comprising an injector having a discharge nozzle and located adjacent the point of application; a tank of chlorine gas under pressure; conduit means for delivering chlorine gas from said tank to said injector; hydraulically actuated regulator valve means in said conduit means adjacent said gas tank and effective to reduce the pressure of the chlorine gas from said tank; a water main through which water flows under pressure greater than the reduced gas pressure in said conduit means; a first branch pipe leading from said water main to said injector nozzle thereby to mix gas and liquid for delivery to the point of application at the terminal of said conduit; a second branch pipe leading from said water main to said regulator valve, whereby the pressure of the chlorine gas is reduced proportionate to the water pressure acting on said valve means; and an evacuator assembly in said conduit between said injector and regulator valve, said evacuator assembly having a valve and communicating with said water main, the liquid pressure in said water main being effective to normally seat said evacuator valve, and said valve being adapted to open upon the lowering of pressure in said water main below the gas pressure in said conduit means, and thereby evacuate to the atmosphere the chlorine gas from said conduit means.

2. Chlorine gas feeding and control means comprising a tank of chlorine gas under pressure; a conduit leading from said tank to the point of application; a hydraulically actuated regulator valve interposed in said conduit adjacent said gas tank and communicating therewith, said valve being operable to reduce the pressure of the gas in said conduit between said valve and the point of application; an injector having a liquid discharge nozzle therein and located in said conduit remote to said regulator valve; a water main through which water flows at higher pressure than the gas pressure in said conduit ahead of said regulator valve; means delivering water from said main to said injector nozzle for mixing liquid with gas and for the delivery of the mixture to the point of application; a pipe feeding water from said main to said regulator valve whereby the gas pressure is reduced proportionate to the water pressure in said main; an evacuator assembly in communication with said conduit between said regulator valve and said injector; said evacuator assembly comprising a housing having a gas discharge port; a water inlet port receiving liquid pressure from said water main; a valve seat intermediate said ports, a normally closed vent valve controlling said seat; means operative in response to the water pressure in said water main for seating said vent valve; mechanical means effective to open said vent valve upon failure of said water pressure for evacuating said conduit of chlorine gas; and a check valve in said conduit between said evacuator and said injector for arresting flow of water from said injector nozzle into said gas conduit.

3. Chlorine gas feeding and control means comprising a tank of chlorine gas under pressure; a regulator valve adjacent said gas tank and operative to reduce the pressure of the chlorine gas; means for feeding gas to said regulator valve from said gas tank; a conduit extending from the delivery side of said regulator valve to the point of application; a water main through which water flows at a pressure greater than the reduced gas pressure in said conduit means; an injector in said conduit remote to said regulator valve and having a discharge nozzle communicating with said water main for mixing liquid with gas and for delivery of the mixture to the point of application; means conducting fluid pressure from said water main to said regulator valve for reducing the pressure of the chlorine gas proportionate to said fluid pressure; and an evacuator assembly between said regulator valve and said injector and having separate chambers communicating respectively with said gas conduit and said water main; valve means between said evacuator chambers and operative in response to said fluid pressure for arresting escape of chlorine gas from said evacuator gas chamber; and mechanical means operative on said valve means and effective to unseat said valve means thereby to evacuate chlorine gas from said conduit upon reduction of said fluid pressure below the gas pressure in said conduit.

4. Chlorine gas feeding and control means comprising a tank of chlorine gas under pressure; a conduit leading from said gas tank to the point of application; a hydraulically actuated regulator valve interposed in said conduit adjacent said gas tank and dividing said conduit into high pressure and low pressure sections leading respectively from said gas tank and from said regulator valve; a liquid injector interposed in said low pressure conduit section remote to said regulator valve; a water main through which water flows at pressure higher than the gas pressure in said high pressure conduit section; means supplying liquid from said water main to said regulator valve for operating said valve to reduce the pressure of the gas proportionate to the water pressure; gas evacuator means interposed in the low pressure conduit section between said regulator valve and said injector, said evacuator means including a valve responsive to liquid pressure from said water main for evacuating gas from said low pressure conduit section upon reduction of liquid pressure in said water main below the gas pressure in said low pressure conduit section; means supplying liquid under pressure from said water main to said evacuator means; and means supplying liquid pressure from said main to said injector thereby to deliver a mixture of gas and liquid to the point of application.

ROY B. EVERSON.

References Cited in the file of this patent

UNITED STATES PATENTS

| Number | Name | Date |
|---|---|---|
| 1,283,993 | Wallace et al. | Nov. 5, 1918 |
| 2,168,616 | Blackmond | Aug. 8, 1939 |
| 2,315,512 | Everson | Apr. 6, 1943 |